US008093849B2

(12) United States Patent  
Shibata

(10) Patent No.: US 8,093,849 B2  
(45) Date of Patent: Jan. 10, 2012

(54) CLOSURE PANEL CONTROL APPARATUS

(75) Inventor: Kazuyuki Shibata, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 596 days.

(21) Appl. No.: 12/219,005

(22) Filed: Jul. 15, 2008

(65) Prior Publication Data

US 2009/0021190 A1     Jan. 22, 2009

(30) Foreign Application Priority Data

Jul. 20, 2007   (JP) ................................ 2007-189796

(51) Int. Cl.
    *G05D 3/00* (2006.01)
(52) U.S. Cl. ........ 318/466; 318/460; 318/461; 318/463; 318/266; 318/DIG. 2; 318/280; 318/281; 318/282; 318/283; 318/284; 318/285; 318/286; 180/281; 307/10.1
(58) Field of Classification Search ............... 318/466, 318/460, 461, 463, 266, 280–286, DIG. 2; 307/10.1; 180/281
    See application file for complete search history.

(56) References Cited

U.S. PATENT DOCUMENTS

| | | | | |
|---|---|---|---|---|
| 5,248,897 A | * | 9/1993 | Lee | 307/10.1 |
| 6,246,195 B1 | * | 6/2001 | Kloesters | 318/280 |
| 7,067,996 B2 | * | 6/2006 | Yamamoto | 318/55 |
| 7,764,036 B2 | * | 7/2010 | Hirai | 318/468 |

FOREIGN PATENT DOCUMENTS

| | | |
|---|---|---|
| JP | A-7-18947 | 1/1995 |
| JP | A-H09-78940 | 3/1997 |
| JP | A-2002-327574 | 11/2002 |
| JP | A-2005-220648 | 8/2005 |

OTHER PUBLICATIONS

Office Action from the Japanese Patent Office in the corresponding Japanese Patent Application No. 2007-189796 dated Oct. 9, 2009 (and English translation).

* cited by examiner

*Primary Examiner* — Bentsu Ro  
*Assistant Examiner* — Erick Glass  
(74) *Attorney, Agent, or Firm* — Posz Law Group, PLC

(57) ABSTRACT

In a closure panel control apparatus, an ECU controls a rotational speed of an electric motor, which provides a drive force to drive a closure panel in an opening movement and a closing movement thereof. The ECU obtains a vehicle speed measured with a vehicle speed sensor and receives a command signal from a switch, which is operable by an occupant of a vehicle to command the opening movement or the closing movement of the closure panel. The ECU controls the rotational speed of the electric motor based on the measured vehicle speed that is obtained at the time of receiving the command signal from the switch.

6 Claims, 5 Drawing Sheets

FIRST SPEED CONTROL PATTERN

SECOND SPEED CONTROL PATTERN

THIRD SPEED CONTROL PATTERN

FIRST SPEED CONTROL PATTERN

FOURTH SPEED CONTROL PATTERN

CLOSURE PANEL CONTROL APPARATUS

CROSS REFERENCE TO RELATED APPLICATION

This application is based on and incorporates herein by reference Japanese Patent Application No. 2007-189796 filed on Jul. 20, 2007.

BACKGROUND OF THE INVENTION

1. Field of the Invention

The present invention relates to a closure panel control apparatus.

2. Description of Related Art

In a known power window apparatus (serving as a closure panel control apparatus), which drives a window glass (serving as a closure panel) of a vehicle to open and close the same, an electric motor is used as a drive source to drive the window glass. In such a power window apparatus, the motor having a high torque is often used to drive the window glass to avoid trouble under various conditions, to which the vehicle may be exposed.

However, the use of the motor having the high torque imposes a need for controlling the rotational speed of the motor to avoid generation of, for example, vibrations and noises at the time of starting and stopping the opening operation and the closing operation of the window glass.

Japanese Patent No. 3374446, which has been previously published as Japanese Unexamined Patent Publication No. H07-018947A, proposes a technique of controlling the motor according to the driving state of the vehicle and the surrounding environment and thereby to gently open and close the window glass.

More specifically, Japanese Patent No. 3374446 teaches a power window control apparatus that senses the driving state of the vehicle and the current surrounding environment around the vehicle and controls the motor based on measurement signals, which indicate the sensed driving state of the vehicle and the surrounding environment.

The power window control apparatus senses whether the current state of the vehicle is in a turning state, an accelerating state, a decelerating state or a constant traveling speed state based on the measurement signals of the sensors, which include, for example, a vehicle speed sensor, a steering wheel angle sensor and a power window glass position sensor. Then, the power window control apparatus selects an appropriate speed map based on the signal, which indicates the determined state of the vehicle, and then controls the motor according to the selected speed map.

Thus, it is possible to perform the motor control operation according to the state of the vehicle, such as the turning state, the accelerating state, the decelerating state or the constant traveling speed state. In this way, fine opening and closing control can be performed, and generation of rattling noise can be limited.

According to Japanese Patent No. 3374446, the rotational control operation of the motor is executed in view of the current state of the vehicle and enables the limiting of the generation of the rattling noise. However, the rotational control operation of the motor is not made in view of the vehicle speed (i.e., the vehicle speed being used to determine, for example, the accelerating state and the decelerating state of the vehicle in Japanese Patent No. 3374446). Since the rotational speed of the motor is reduced at an upper end of a travel path of the window glass regardless of the vehicle speed, it may possibly happen that the window glass cannot be fully closed due to a load applied to the window glass at the time of driving the vehicle at the high vehicle speed.

Specifically, when the vehicle speed is increased, the load, which pulls the window glass toward the outside of the vehicle, is increased.

Therefore, when the motor control operation is executed regardless of the vehicle speed (i.e., reducing the rotational speed of the motor regardless of the vehicle speed), it may possibly happen that the window glass cannot be fully closed, particularly, at the time of driving the vehicle at the high vehicle speed.

SUMMARY OF THE INVENTION

The present invention is made in view of the above disadvantage. According to one aspect of the present invention, there is provided a closure panel control apparatus that reduces a drive speed of a closure panel installed in a vehicle at time when the closure panel reaches a speed reduction start point, which is adjacent to a fully closed position of the closure panel, in a closing movement of the closure panel under a predetermined condition. The closure panel control apparatus includes an electric motor, a drive mechanism and a control means. The electric motor serves as a drive source to drive the closure panel. The drive mechanism converts a rotational force of an output element of the electric motor into an opening movement or the closing movement of the closure panel. The control means is for controlling a rotational speed of the electric motor. The control means obtains a vehicle speed measured with a vehicle speed sensor and receives a command signal from a switch, which is operable by an occupant of the vehicle to command the opening movement or the closing movement of the closure panel. The control means controls the rotational speed of the electric motor based on the measured vehicle speed that is obtained at the time of receiving the command signal from the switch.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
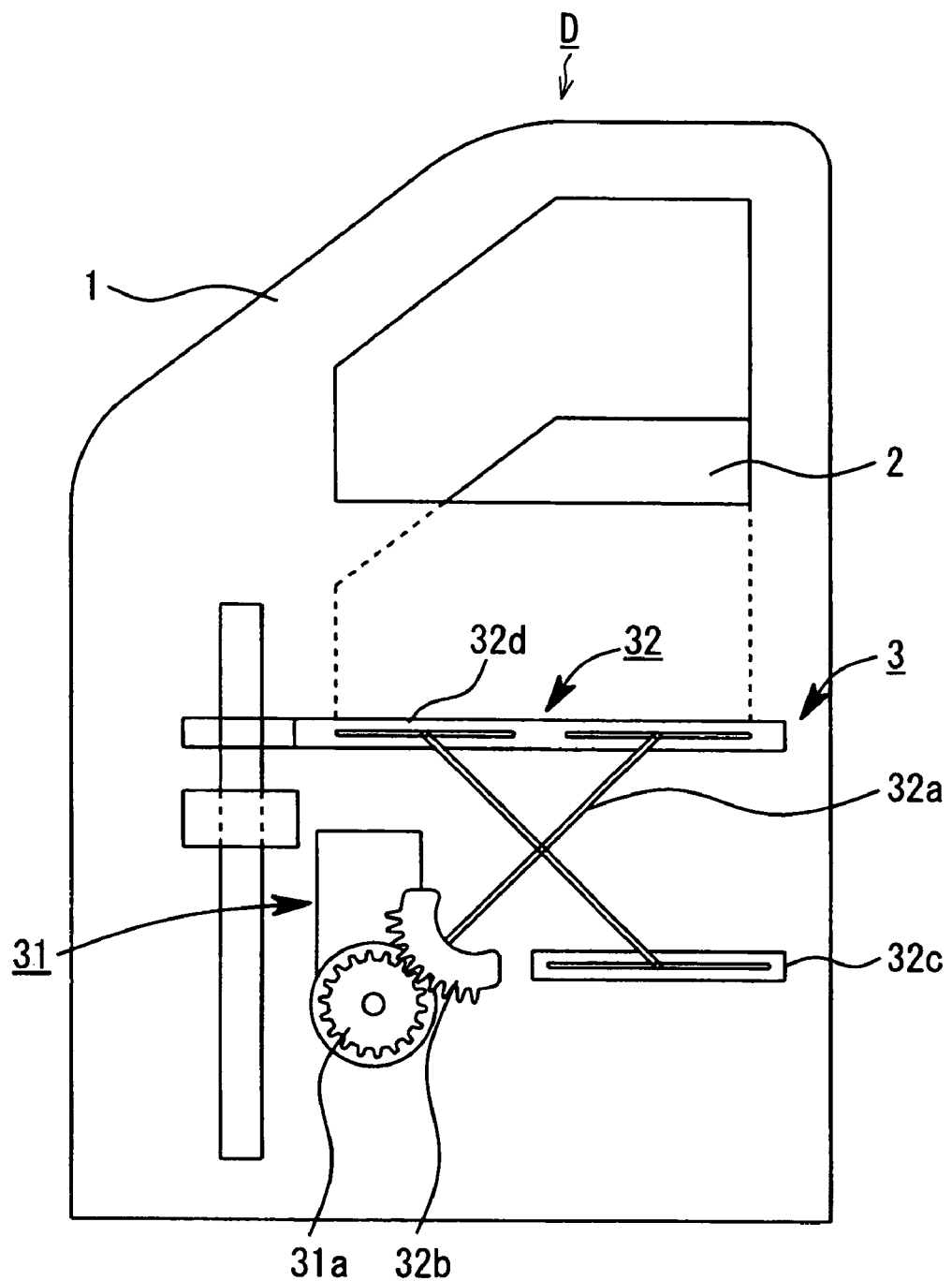
FIG. 1 is a schematic diagram showing a vehicle door having a power window apparatus according to a first embodiment of the present invention.

A structure of a vehicle door D, which includes a power window apparatus serving as a closure panel control apparatus according to a first embodiment of the present invention, will be described with reference to FIG. 1.

The vehicle door D of the present embodiment includes a door panel 1, a window glass (serving as a closure panel) 2 and the power window apparatus 3. The door panel 1 is of a known type and forms a skeletal structure of the vehicle door D in corporation with a door trim (not shown). The window glass 2 is of a known type, which is placed in a side window (door window) of the vehicle.

Furthermore, the power window apparatus 3 upwardly and downwardly drives the window glass 2 in the vertical direction and is of an X-arm type in the present embodiment. In the present embodiment, although the X-arm type is used, the power window apparatus 3 is not limited to the X-arm type and may be of any other suitable type, which converts a drive force of an electric motor 31 to upwardly and downwardly drive the window glass 2 in the vertical direction.

The power window apparatus 3 of the present embodiment includes the motor 31 and a regulator (serving as a drive mechanism) 32. The motor 31, is the drive source of the power window apparatus 3 and includes an output gear (an output element) 31a. The regulator 32 is a regulator of an X-arm type and includes an X-arm assembly 32a, a sector gear 32b, a stationary arm 32c and a liftable arm 32d. The X-arm assembly 32a is an arm assembly, which includes two arms that are connected together at intermediate locations thereof to form an X-configuration. Furthermore, the X-arm assembly 32a transmits the drive force from the motor 31 to the window glass 2. The sector gear 32b is meshed with the output gear 31a of the motor 31 and transmits the output of the motor 31 to the X-arm assembly 32a. The stationary arm 32c is fixed to the door panel 1, and a lower end portion of the window glass 2 is fixed to the liftable arm 32d. The sector gear 32b is fixed to a lower end of one of the arms of the X-arm assembly 32a, and the stationary arm 32c is connected to a lower end of the other one of the arms of the X-arm assembly 32a. Upper ends of the arms of the X-arm assembly 32a are connected to the liftable arm 32d.

With the above construction, when the motor 31 is driven to rotate the output gear 31a, the drive force is transmitted from the output gear 31a to the X-arm assembly 32a through the sector gear 32b to pivot the X-arm assembly 32a, so that the liftable arm 32d is upwardly or downwardly driven in the vertical direction. Through the upward or downward movement of the liftable arm 32d, the window glass 2, which is fixed to the liftable arm 32d, is upwardly or downwardly driven in the vertical direction.

Figure 2:
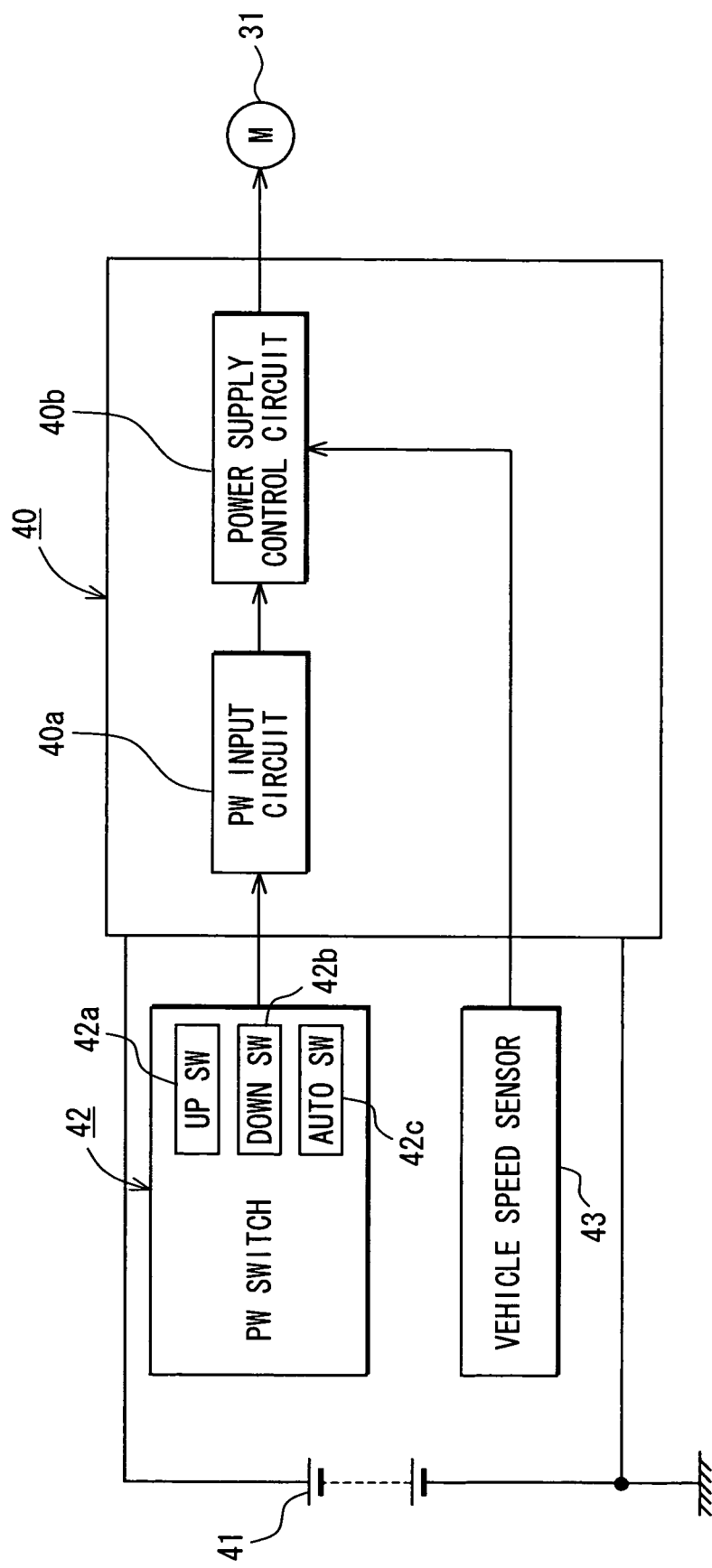
FIG. 2 is a circuit diagram showing an electrical structure of the power window system.

FIG. 2 is the block diagram showing the electrical structure of the power window apparatus 3 according to the present embodiment.

Here, it should be noted that the structure shown in FIG. 2 is simplified to provide the clear understanding of the present embodiment, and components, which are not directly relevant to the present embodiment, are omitted for the sake of simplicity.

The motor 31 is connected to a window electronic computer unit or window electronic control unit (ECU) 40, which serves as a control means. The rotation of the motor 31 is controlled by the window ECU 40. The window ECU 40 is powered from a battery 41 of the vehicle. Furthermore, the window ECU 40 has a power window (PW) input circuit 40a and a power supply control circuit 40b. A power window (PW) switch 42 and a vehicle speed sensor 43 and the motor 31 are connected to the window ECU 40. Although other devices and sensors are also connected to the window ECU 40, they are not directly relevant to the present embodiment and are thereby not depicted for the sake of simplicity.

The power window switch 42 is operable by an occupant of the vehicle and includes a closing switch (UP SW) 42a, an opening switch (DOWN SW) 42b and an automatic switch (AUTO SW) 42c and is connected to the power window input circuit 40a of the window ECU 40. The closing switch (UP SW) 42a is for raising the window glass 2 in a closing direction. The opening switch (DOWN SW) 42b is for lowering the window glass 2 in an opening direction. The automatic switch (AUTO SW) 42c is for raising the window glass 2 all the way to the fully closed position at once or for lowering the window glass 2 all the way to the fully opened position at once.

The input signal, which is supplied from the power window switch 42, is inputted to the power window input circuit 40a and is then inputted to the power supply control circuit 40b through the power window input circuit 40a.

The closing switch (UP SW) 42a, the opening switch (DOWN SW) 42b and the automatic switch (AUTO SW) 42c are provided in the single power window switch 42 according to the present embodiment. The power window switch 42 is a rocker switch (a seesaw type switch), which is operable in two steps. When the power window switch 42 is manipulated in one step toward one end side thereof, the opening switch (DOWN SW) 42b is turned on to execute the normal opening movement of the window glass 2. When the power window switch 42 is manipulated in one step toward the other end side thereof, the closing switch (UP SW) 42a is turned on to execute the normal closing movement of the window glass 2.

Furthermore, when the power window switch 42 is manipulated in two steps toward the one end side thereof, the opening switch (DOWN SW) 42b and the automatic switch (AUTO SW) 42c are both turned on to execute the automatic opening operation of the window glass 2. Also, when the power window switch 42 is manipulated in two steps toward the other end side thereof, the closing switch (UP SW) 42a and the automatic switch (AUTO SW) 42c are both turned on to execute the automatic closing operation of the window glass 2.

Specifically, when one of the closing switch (UP SW) 42a and the opening switch (DOWN SW) 42b is turned on alone, the window ECU 40 supplies the electric power to the motor 31 to drive the window glass 2 in the specified direction only through the period of receiving the signal from the one of the closing switch (UP SW) 42a and the opening switch (DOWN SW) 42b, i.e., only through the period of manipulating the one of the closing switch (UP SW) 42a and the opening switch (DOWN SW) 42b. Furthermore, when the automatic switch (AUTO SW) 42c is turned on in addition to the one of the closing switch (UP SW) 42a and the opening switch (DOWN SW) 42b, the window ECU 40 supplies the electric power to the motor 31 to drive the window glass 2 in the specified direction all the way to the corresponding one of the fully closed position and the fully opened position even in a case where the signal from these switches is turned off (i.e., in a case where the manipulation of the power window switch 42 is stopped).

Furthermore, the vehicle speed sensor 43 is connected to the power supply control circuit 40b. In the power supply control circuit 40b, a speed control pattern is selected based on the input signal, which is received from the power window switch 42 through the power window input circuit 40a, and the vehicle speed, which is measured with the vehicle speed sensor 43. Then, based on the selected speed control pattern, the power supply control circuit 40b controls the electric current or the electric voltage supplied to the motor 31.

Next, the speed control pattern of the motor 31 used in the present embodiment will be described with reference to FIGS. 3A to 3C. The speed control pattern serves as a chart of the present invention.

Figure 3A:
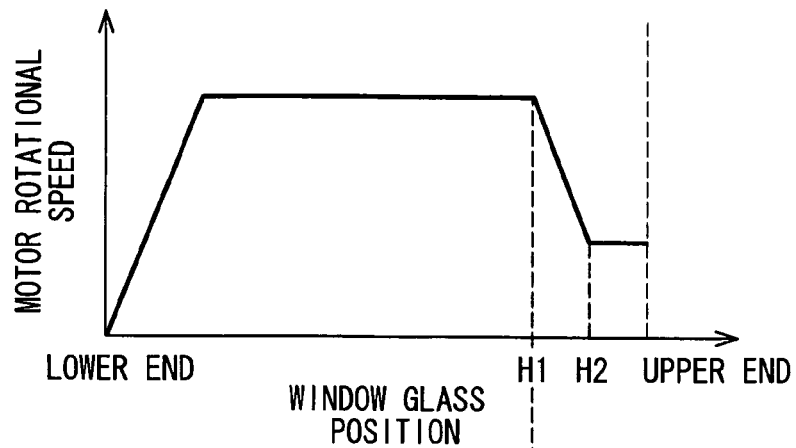
FIGS. 3A to 3C are diagrams showing speed control patterns according to the first embodiment.

A first speed control pattern shown in FIG. 3A is a speed control pattern (a normal speed control pattern), which has been conventionally used.

In the first speed control pattern, initially, the rotational speed of the motor 31 is progressively increased. Then, when the window glass 2 is moved for a predetermined distance or a predetermined time period, the motor 31 is driven at a predetermined rotational speed, or a predetermined amount of electric power is supplied to the motor 31 to drive the motor 31. Then, when the window glass 2 is raised further and thereby reaches a speed reduction start point H1, which is spaced from but adjacent to, i.e., near a fully closed position (an upper end of a travel path) of the window glass 2, the rotational speed of the motor 31 is progressively reduced. Thereafter, when the window glass 2 is further raised and reaches a speed holding start point H2, the current rotational speed of the motor 31 is maintained.

That is, the motor 31 is rotated at the predetermined speed until the window glass 2 approaches the upper end of the travel path thereof. Then, the rotational speed of the motor 31 is reduced to gently receive the upper end portion of the window glass 2 into a weather strip of the door.

Figure 3B:
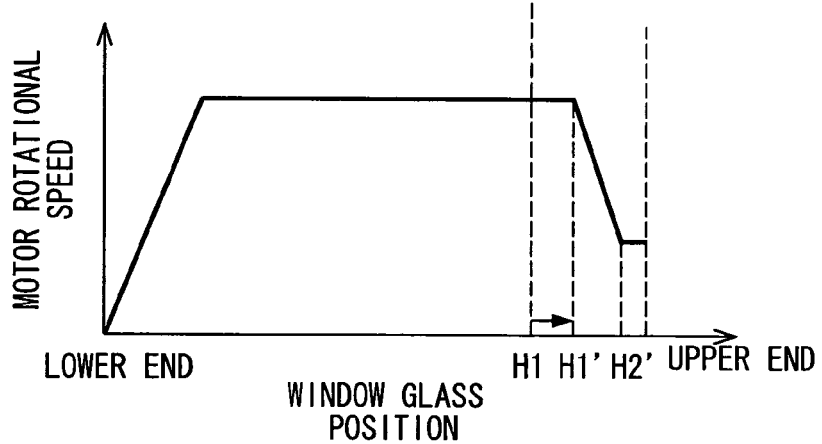

In a second speed control pattern shown in FIG. 3B, initially, the rotational speed of the motor 31 is progressively increased. When the window glass 2 is moved for a predetermined distance or a predetermined time period, the motor 31 is driven at a predetermined rotational speed, or a predetermined amount of electric power is supplied to the motor 31 to drive the motor 31. Then, when the window glass 2 is raised further and thereby reaches a speed reduction start point H1', the rotational speed of the motor 31 is progressively reduced. Thereafter, when the window glass 2 is further raised and reaches a speed holding start point H2', the current rotational speed of the motor 31 is maintained.

Here, the timing for reducing the rotational speed of the motor 31 is different from that of the first speed control pattern. More specifically, the speed reduction start point H1' of the second speed control pattern is shifted from the speed reduction start point H1 of the first speed control pattern. That is, in the second speed control pattern, the time period of maintaining the normal constant high rotational speed of the motor 31 before the speed reduction start point H1' in the closing operation of the window glass 2 is lengthened in comparison to that of the first speed control pattern. This is for the following reason. That is, when the vehicle speed is increased, a negative pressure applied to the window glass 2, i.e., a force of pulling the window glass 2 toward the outside of the vehicle is increased. In view of this, the period of rotating the motor 31 at the normal constant high rotational speed is lengthened as much as possible by reducing the rotational speed reducing time period as much as possible, so that the upper end portion of the window glass 2 can be reliably received into the weather strip.

In other words, the window glass 2 is moved at the high speed to reduce the operational time period. Thereby, a cumulative value of the load applied to the window glass 2 is reduced to reliably close the window glass 2.

Figure 3C:
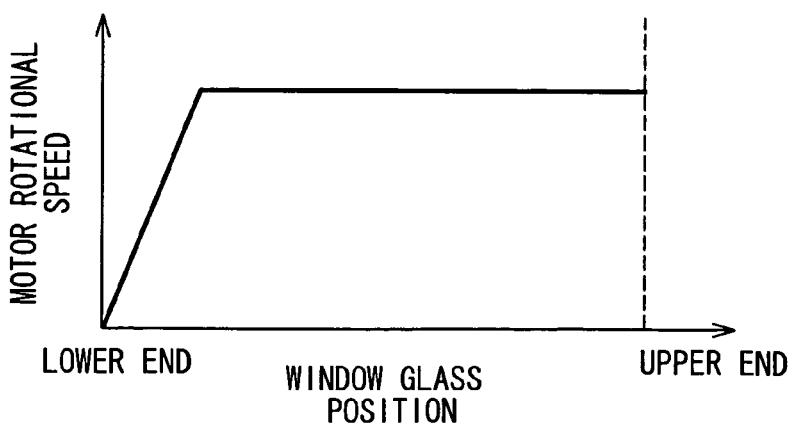

In a third speed control pattern shown in FIG. 3C, initially, the rotational speed of the motor 31 is progressively increased. Then, when the window glass 2 is moved for a predetermined distance or a predetermined time period, the motor 31 is driven at a predetermined rotational speed, or a predetermined amount of electric power is supplied to the motor 31 to drive the motor 31. Here, the rotational speed reducing time period of the motor 31 is substantially eliminated in the third speed control pattern.

When the vehicle speed is further increased, the load applied to the window glass 2 (the force of pulling the window glass 2 toward the outside of the vehicle) is further increased.

Thus, when the rotational speed of the motor 31 is reduced, the possibility of not receiving the upper end portion of the window glass 2 into the weather strip is increased. In view of this, the rotational speed reducing time period is eliminated to reliably receive the upper end portion of the window glass 2 into the weather strip.

In other words, the window glass 2 is moved at the high speed to reduce the operational time period. Thereby, the cumulative value of the load applied to the window glass 2 is reduced to reliably close the window glass 2.

In the present embodiment, the rotational speed reducing range (i.e., a range in which the rotational speed of the motor 31 is reduced) is from the location, at which the window glass 2 is raised to form an opening width of 100 mm at the side window, to the location, at which the upper end of the window glass 2 is received into the weather strip.

However, the rotational speed reducing range is not limited to this and may be modified, i.e., increased or decreased in an appropriate manner.

Figure 4:
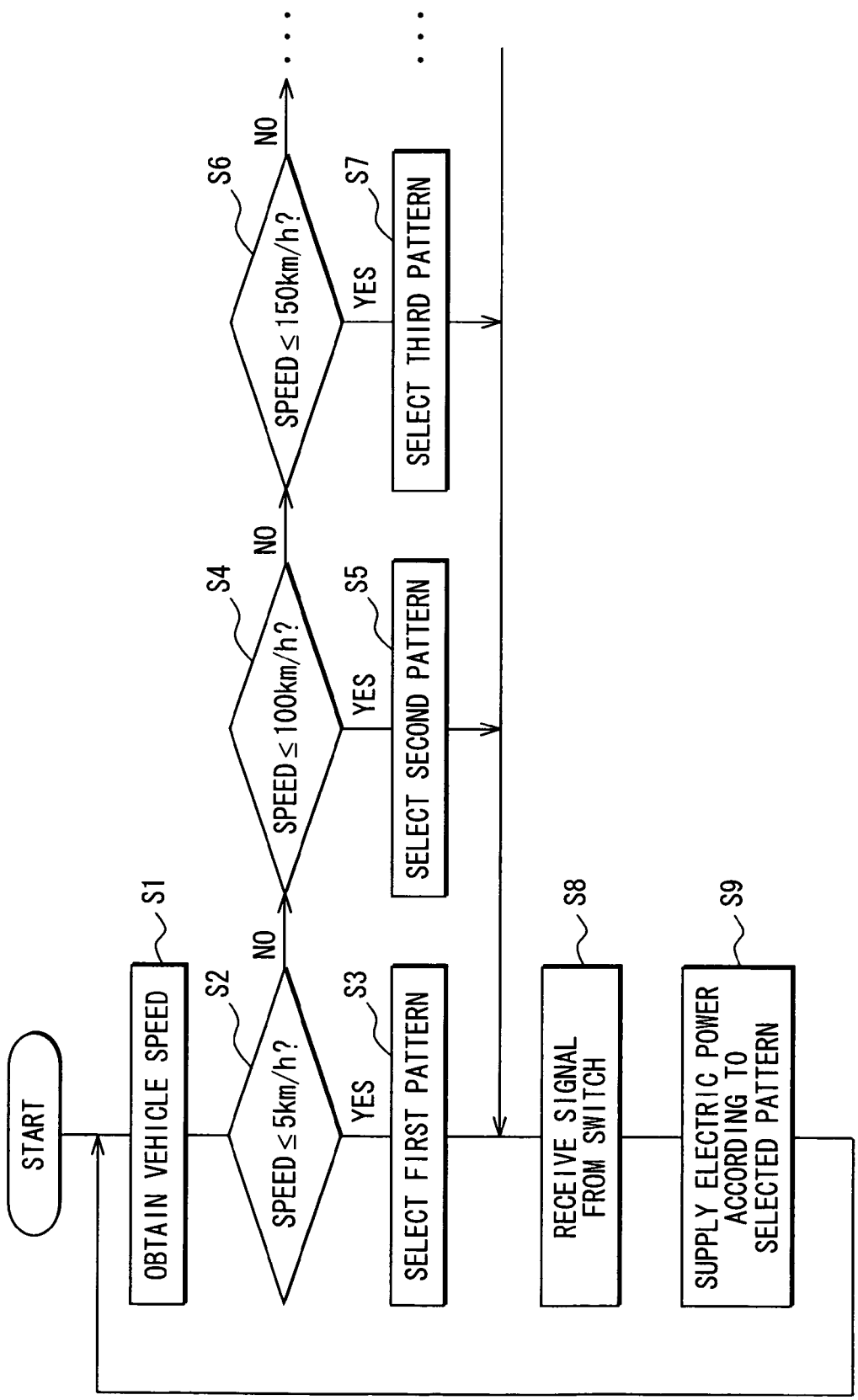
FIG. 4 is a flowchart showing a control operation of a window ECU according to the first embodiment.

Next, the control operation of the window ECU 40 will be described with reference to the flowchart of FIG. 4. Here, the present embodiment is described with reference to the case where the window glass 2 is closed, i.e., the case where the upper end portion of the window glass 2 is moved upward and is received in the weather strip.

First, at step S1, the vehicle speed is obtained from the vehicle speed sensor 43.

Then, at step S2, it is determined whether the vehicle speed, which is measured with the vehicle speed sensor 43, is equal to or less than 5 km/h.

When it is determined that the vehicle speed is equal to or less than 5 km/h at step S2 (i.e., YES at step S2), the first speed control pattern is selected at step S3.

In contrast, when it is determined that the vehicle speed is not equal to or less than 5 km/h at step S2 (i.e., NO at step S2), the ECU 40 proceeds to step S4. At step 54, it is determined whether the vehicle speed is equal to or less than 100 km/h.

When it is determined that the vehicle speed is equal to or less than 100 km/h at step 54 (i.e., YES at step 54), the second speed control pattern is selected at step S5.

That is, in the case of 5 km/h<Vehicle Speed≦100 km/h, the second speed control pattern is selected.

As described above, the second speed control pattern is different from the first speed control pattern in terms of the timing of reducing the rotational speed of the motor 31. Specifically, in the second speed control pattern, the timing of reducing the rotational speed of the motor 31 is shifted, i.e., is retarded from the point H1 to the point H1'.

That is, in the second speed control pattern, the time period of maintaining the constant rotational speed of the motor 31 is lengthened in comparison to the first speed control pattern.

Thereby, the time period of rotating the motor 31 at the constant high rotational speed is lengthened (thereby, the rotational speed reducing time period being reduced), so that the upper end of the window glass 2 can be reliably received into the weather strip.

When it is determined that the vehicle speed is not equal to or less than 100 km/h at step 54 (i.e., NO at step 54), the ECU 40 proceeds to step S6. At step S6, it is determined whether the vehicle speed is equal to or less than 150 km/h.

When it is determined that the vehicle speed is equal to or less than 150 km/h at step S6 (i.e., YES at step S6), the ECU 40 proceeds to step S7. At step S7, the third speed control pattern is selected.

That is, in the case of 100 km/h<Vehicle Speed≦150 km/h, the third speed control pattern is selected.

As described above, the third speed control pattern is the pattern for progressively increasing the rotational speed of the motor 31 until reaching the predetermined value (or until reaching of the window glass 2 to the predetermined position) and thereafter maintaining that rotational speed all the way up to the upper end of the travel path of the window glass 2.

That is, the rotational speed reducing time period of the motor 31 is substantially eliminated in the third speed control pattern.

Thus, even in the case where the vehicle speed is further increased to increase the load applied to the window glass 2, the cumulative value of the load applied to the window glass 2 is reduced to reliably receive the upper end of the window glass 2 in the weather strip.

As described above, the vehicle speed is classified into the corresponding speed range, and the pattern is selected according to classified speed range. After, returning of NO at step S6, similar steps, which are similar to the above described ones, are taken for the vehicle speed beyond 150 km, i.e., the vehicle speed is classified into the corresponding speed range, and the speed control pattern is applied based on the corresponding speed range. Therefore, the description of steps after returning of NO at step S6 will not be discussed for the sake of simplicity.

When the input signal is received from the power window switch 42 at step S8 upon the selection of the corresponding speed control pattern at step S3, S5, S7 or the like, the ECU 40 proceeds to step S9. At step S9, the ECU 40 supplies the electric power to the motor 31 according to the selected speed control pattern.

As described above, the vehicle speed is measured, and the motor control operation is executed to rotate the motor at the corresponding rotational speed, which corresponds to the negative air pressure that is generated at the time of driving the vehicle at the measured vehicle speed.

In the present embodiment, the three speed control patterns are described. However, the types of the speed control patterns should not be limited to the above described ones. That is, depending on the need, it is possible to use other pattern(s), in which the number of the speed reducing points of the motor 31 is increased (the number of the points H are increased), i.e., in which the rotational speed of the motor 31 is reduced through multiple steps instead of the single step. Alternatively, it is possible to use the reduced number of speed control patterns (e.g., using only the first speed control pattern and the second speed control pattern) to control the motor 31.

The above embodiment may be modified in the following manner.

Another embodiment will be described as the modification of the above embodiment.

In the following description, components, which are similar to the above described components, will be indicated by the same reference numerals and will not be described further for the sake of simplicity.

Second Embodiment

Figure 5A:
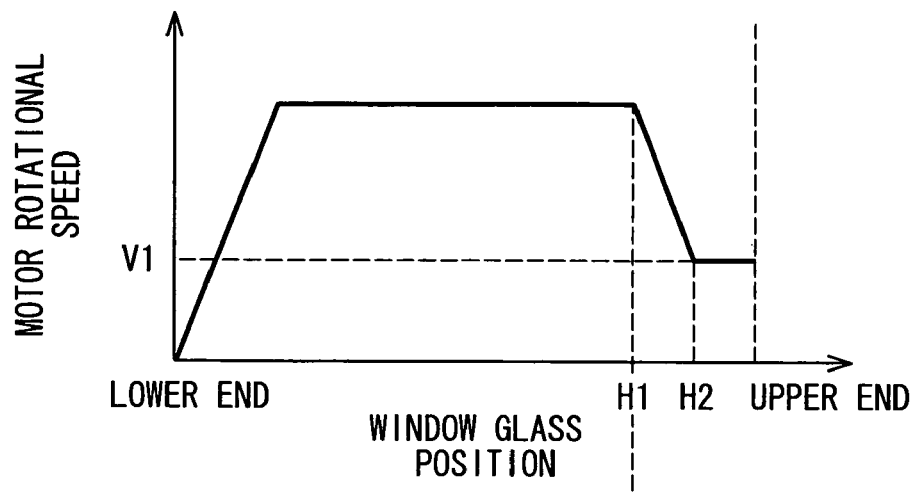
FIGS. 5A and 5B are diagrams showing speed control patterns according to a second embodiment of the present invention.

A second embodiment of the present invention will be described with reference to FIGS. 5A and 5B. In the second embodiment, the speed control patterns are modified from the first embodiment.

Other than the modification of the speed control patterns, the second embodiment is similar to the first embodiment.

Figure 5B:
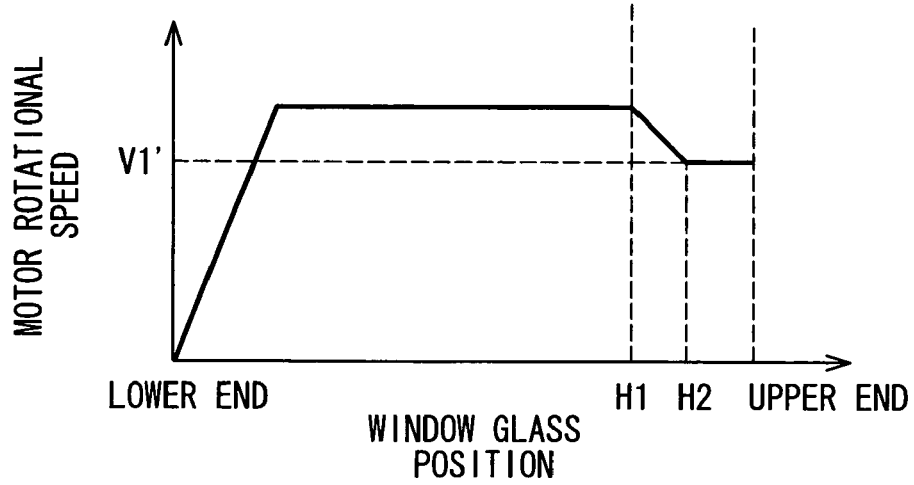

FIG. 5B shows a fourth speed control pattern according to the second embodiment.

In the present embodiment, the second speed control pattern of the first embodiment is changed to the fourth speed control pattern.

In the fourth speed control pattern, initially, the rotational speed of the motor 31 is progressively increased. Then, when the window glass 2 is moved for a predetermined distance or a predetermined time period, the motor 31 is driven at a predetermined rotational speed, or a predetermined amount of electric power is supplied to the motor 31 to drive the motor 31. Then, when the window glass 2 is raised further and thereby reaches the speed reduction start point H1, the rotational speed of the motor 31 is progressively reduced. Thereafter, when the window glass 2 is further raised and reaches the speed holding start point H2, at which the rotational speed of the motor 31 reaches a predetermined rotational speed V1', the current rotational speed of the motor 31 is maintained.

Here, the amount of reduction in the rotational speed of the motor 31 is different from that of the first speed control pattern, and the rotational speed of the motor 31 at the upper end of the travel path of the window glass 2 is shifted to the rotational speed V1'. That is, the rotational speed (speed V1') of the motor 31 at the time of reaching the upper end of the travel path of the window glass 2 is increased in comparison to that (speed V1 of FIG. 5A) of the first speed control pattern.

This is due to the following reason. That is, when the vehicle speed is increased, the load applied to the window glass 2 is increased. Therefore, the rotational speed of the motor 31 is increased as much as possible within a permissible range to overcome the load applied to the window glass 2 and thereby to reliably receive the upper end of the window glass 2 into the weather strip.

The rotational speed reducing time period of the motor 31 is reduced in the first embodiment while the amount of reduction in the rotational speed of the motor 31 is reduced in the second embodiment. Alternatively, these two patterns (the second speed control pattern and the fourth speed control pattern) may be combined in an appropriate manner. Further alternatively, these two patterns and the third speed control pattern may be combined in an appropriate manner.

In the above embodiments, the window glass 2 is used as the closure panel. However, the closure panel is not limited to the window glass 2. For example, the present invention may be applied to a sunroof apparatus, and a sunroof panel may be used as the closure panel.

Additional advantages and modifications will readily occur to those skilled in the art. The invention in its broader terms is therefore not limited to the specific details, representative apparatus, and illustrative examples shown and described.

What is claimed is:

1. A closure panel control apparatus that reduces a drive speed of a closure panel installed in a vehicle at time when the closure panel reaches a speed reduction start point, which is adjacent to a fully closed position of the closure panel, in a closing movement of the closure panel under a predetermined condition, the closure panel control apparatus comprising:

an electric motor that serves as a drive source to drive the closure panel;

a drive mechanism that converts a rotational force of an output element of the electric motor into an opening movement or the closing movement of the closure panel; and a control means for controlling a rotational speed of the electric motor, wherein:

the control means obtains a vehicle speed measured with a vehicle speed sensor and receives a command signal from a switch, which is operable by an occupant of the vehicle to command the opening movement or the closing movement of the closure panel;

the control means controls the rotational speed of the electric motor based on the measured vehicle speed that is obtained at the time of receiving the command signal from the switch;

the control means stores a plurality of charts, each of which specifies the rotational speed of the electric motor for each corresponding vehicle speed; and when the control means receives the command signal from the switch, the control means selects a corresponding one of the plurality of charts, which corresponds to the measured vehicle speed obtained at the time of receiving the command signal from the switch, and controls the electric motor according to the selected chart;

each of the plurality of charts includes a rotational speed reducing time period, during which the rotational speed of the electric motor is reduced upon reaching of the closure panel to the speed reduction start point adjacent to the fully closed position in the closing movement of the closure panel; and the rotational speed reducing time periods of the plurality of charts differ from one another.

2. The closure panel control apparatus according to claim 1, wherein the rotational speed reducing time period of one of the plurality of charts, which corresponds to a first vehicle speed, is set to be longer than the rotational speed reducing time period of another one of the plurality of charts, which corresponds to a second vehicle speed that is higher than the first vehicle speed.

3. A closure panel control apparatus that reduces a drive speed of a closure panel installed in a vehicle at time when the closure panel reaches a speed reduction start point, which is adjacent to a fully closed position of the closure panel, in a closing movement of the closure panel under a predetermined condition, the closure panel control apparatus comprising:

an electric motor that serves as a drive source to drive the closure panel;

a drive mechanism that converts a rotational force of an output element of the electric motor into an opening movement or the closing movement of the closure panel; and a control means for controlling a rotational speed of the electric motor, wherein:

the control means obtains a vehicle speed measured with a vehicle speed sensor and receives a command signal from a switch, which is operable by an occupant of the vehicle to command the opening movement or the closing movement of the closure panel;

the control means controls the rotational speed of the electric motor based on the measured vehicle speed that is obtained at the time of receiving the command signal from the switch;

the control means stores a plurality of charts, each of which specifies the rotational speed of the electric motor for each corresponding vehicle speed; and when the control means receives the command signal from the switch, the control means selects a corresponding one of the plurality of charts, which corresponds to the measured vehicle speed obtained at the time of receiving the command signal from the switch, and controls the electric motor according to the selected chart;

each of the plurality of charts includes a rotational speed reducing time period, during which the rotational speed of the electric motor is reduced upon reaching of the closure panel to the speed reduction start point adjacent to the fully closed position in the closing movement of the closure panel; and an amount of reduction in the rotational speed of the electric motor differs among the rotational speed reducing time periods of the plurality of charts.

4. The closure panel control apparatus according to claim 3, wherein the amount of reduction in the rotational speed of the electric motor in one of the plurality of charts, which corresponds to a first vehicle speed, is set to be larger than the amount of reduction in the rotational speed of the electric motor in another one of the plurality of charts, which corresponds to a second vehicle speed that is higher than the first vehicle speed.

5. A closure panel control apparatus that reduces a drive speed of a closure panel installed in a vehicle at time when the closure panel reaches a speed reduction start point, which is adjacent to a fully closed position of the closure panel, in a closing movement of the closure panel under a predetermined condition, the closure panel control apparatus comprising:

an electric motor that serves as a drive source to drive the closure panel;

a drive mechanism that converts a rotational force of an output element of the electric motor into an opening movement or the closing movement of the closure panel; and a control means for controlling a rotational speed of the electric motor, wherein:

the control means obtains a vehicle speed measured with a vehicle speed sensor and receives a command signal from a switch, which is operable by an occupant of the vehicle to command the opening movement or the closing movement of the closure panel;

the control means controls the rotational speed of the electric motor based on the measured vehicle speed that is obtained at the time of receiving the command signal from the switch;

the control means stores a plurality of charts, each of which specifies the rotational speed of the electric motor for each corresponding vehicle speed; and when the control means receives the command signal from the switch, the control means selects a corresponding one of the plurality of charts, which corresponds to the measured vehicle speed obtained at the time of receiving the command signal from the switch, and controls the electric motor according to the selected chart;

the plurality of charts includes:

a plurality of speed reducing charts, each of which includes a rotational speed reducing time period, during which the rotational speed of the electric motor is reduced upon reaching of the closure panel to the speed reduction start point adjacent to the fully closed position of the closure panel in the closing movement of the closure panel; and at least one speed non-reducing chart that does not have the speed reducing time period, during which the rotational speed of the electric motor is reduced upon reaching of the closure panel to the speed reduction start point adjacent to the fully closed position in the closing movement of the closure panel;

the plurality of speed reducing charts is set to satisfy at least one of the following conditions:

the rotational speed reducing time periods of the plurality of speed reducing charts differ from one another; and an amount of reduction in the rotational speed of the electric motor differs among the rotational speed reducing time periods of the plurality of speed reducing charts.

6. A closure panel control apparatus that reduces a drive speed of a closure panel installed in a vehicle at time when the closure panel reaches a speed reduction start point, which is adjacent to a fully closed position of the closure panel, in a closing movement of the closure panel under a predetermined condition, the closure panel control apparatus comprising:

an electric motor that serves as a drive source to drive the closure panel;

a drive mechanism that converts a rotational force of an output element of the electric motor into an opening movement or the closing movement of the closure panel; and a control means for controlling a rotational speed of the electric motor, wherein:

the control means obtains a vehicle speed measured with a vehicle speed sensor and receives a command signal from a switch, which is operable by an occupant of the vehicle to command the opening movement or the closing movement of the closure panel;

the control means controls the rotational speed of the electric motor based on the measured vehicle speed that is obtained at the time of receiving the command signal from the switch; and the rotational speed of the electric motor at the time of reducing the drive speed of the closure panel upon reaching of the closure panel to the speed reduction start point is set to be higher by the control means in a case where the measured vehicle speed is higher than a predetermined speed in comparison to a case where the measured vehicle speed is lower than the predetermined speed.

* * * * *